(12) United States Patent
Takamura et al.

(10) Patent No.: US 8,994,649 B2
(45) Date of Patent: Mar. 31, 2015

(54) ELECTRONIC CONFERENCING SYSTEM, ELECTRONIC CONFERENCING METHOD, AND ELECTRONIC CONFERENCING PROGRAM

(75) Inventors: Shunsuke Takamura, Kokubunji (JP); Moeko Hagiwara, Ichikawa (JP); Toshihiro Motoi, Tokyo (JP); Yoichi Kawabuchi, Hachioji (JP); Yasuhiko Yamaguchi, Hino (JP); Kenta Hosaka, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 228 days.

(21) Appl. No.: 13/419,354

(22) Filed: Mar. 13, 2012

(65) Prior Publication Data
US 2012/0242571 A1    Sep. 27, 2012

(30) Foreign Application Priority Data

Mar. 24, 2011  (JP) .................................. 2011-065242

(51) Int. Cl.
| | | |
|---|---|---|
| G09G 5/00 | (2006.01) | |
| G09G 5/36 | (2006.01) | |
| G09G 5/373 | (2006.01) | |
| G06F 3/14 | (2006.01) | |

(52) U.S. Cl.
CPC .................. *G09G 5/36* (2013.01); *G09G 5/373* (2013.01); *G06F 3/1454* (2013.01); *G09G 2340/045* (2013.01); *G09G 2354/00* (2013.01)
USPC .......................................................... 345/156

(58) Field of Classification Search
None
See application file for complete search history.

(56) References Cited

U.S. PATENT DOCUMENTS

| 8,159,507 B2 | 4/2012 | Nishibori | |
| 2003/0098819 A1* | 5/2003 | Sukthankar et al. | ........... 345/1.1 |

(Continued)

FOREIGN PATENT DOCUMENTS

| JP | 06-110420 | 4/1994 |
| JP | 2002-182638 | 6/2002 |

(Continued)

OTHER PUBLICATIONS

Notice of Reasons for Refusal from JPO for Appl. No. JP 2011-065242, drafted Apr. 2, 2014, 4 pgs.

(Continued)

*Primary Examiner* — Adam R Giesy
*Assistant Examiner* — Henok Heyi
(74) *Attorney, Agent, or Firm* — Squire Patton Boggs (US) LLP

(57) ABSTRACT

A data manipulation transmission apparatus including: an object acquisition section for acquiring a display object, generated on display screen 1 of an information input device based on input to the device, from the device manipulated by an individual; a distance information acquisition section for acquiring distance information from display screen 2 of a common display apparatus to a person viewing display screen 2 when viewed by plural people; a display ratio determining section for determining a ratio of a display size of an arbitrary display object on display screen 2, to a display size of the arbitrary display object on display screen 1, according to the distance information; and a display data transmission section for generating data to display a display object, acquired by the object acquisition section, on display screen 2, at a ratio determined via the display ratio determining section, and transmitting the data to the common display apparatus.

14 Claims, 13 Drawing Sheets

(56) References Cited

U.S. PATENT DOCUMENTS

| | | | |
|---|---|---|---|
| 2004/0051719 | A1 | 3/2004 | Fukui et al. |
| 2007/0093957 | A1 | 4/2007 | Kikuchi et al. |
| 2007/0242813 | A1 | 10/2007 | Horikiri et al. |
| 2010/0118055 | A1* | 5/2010 | Nishibori ............... 345/666 |
| 2010/0127970 | A1* | 5/2010 | Oba et al. ............... 345/156 |
| 2011/0052009 | A1* | 3/2011 | Berkovich et al. ............ 382/106 |
| 2011/0090149 | A1* | 4/2011 | Larsen et al. ............ 345/158 |
| 2011/0242098 | A1* | 10/2011 | Tamaru ............... 345/419 |

FOREIGN PATENT DOCUMENTS

| | | |
|---|---|---|
| JP | 2002-358065 | 12/2002 |
| JP | 2005-128801 | 5/2005 |
| JP | 2007-079240 | 3/2007 |
| JP | 2007-241537 | 9/2007 |
| JP | 2007-286780 | 11/2007 |
| JP | 2008-96776 | 4/2008 |
| JP | 2009-063636 | 3/2009 |
| JP | 2010-185962 | 8/2010 |
| WO | WO 02/067102 | 8/2002 |
| WO | WO 2008/007703 | 1/2008 |

OTHER PUBLICATIONS

Translation of the Notice of Reasons for Refusal from JPO for Appl. No. JP 2011-065242, drafted Apr. 2, 2014, 4 pgs.

Notice of Reasons for Refusal issued by JPO for Appl. No. 2011-065242, mailed Jul. 8, 2014, 3 pgs.

Translation of the Notice of Reasons for Refusal issued by JPO for Appl. No. 2011-065242, mailed Jul. 8, 2014, 6 pgs.

* cited by examiner

| DISTANCE (m) | SIZE (AREA) (mm$^2$) |
|---|---|
| 1 | 5,005 |
| 2 | 20,020 |
| 3 | 45,045 |
| 4 | 80,080 |
| 5 | 125,125 |
| ⋮ | ⋮ |

| DISTANCE (m) | CHARACTER SIZE - LONGITUDINAL (mm) |
|---|---|
| 1 | 10 |
| 2 | 20 |
| 3 | 30 |
| 4 | 40 |
| 5 | 50 |
| ⋮ | ⋮ |

ELECTRONIC CONFERENCING SYSTEM, ELECTRONIC CONFERENCING METHOD, AND ELECTRONIC CONFERENCING PROGRAM

This application is based on Japanese Patent Application No. 2011-065242 filed on Mar. 24, 2011 with the Japan Patent Office, the entire content of which is hereby incorporated by reference.

TECHNICAL FIELD

The present invention relates to a data manipulation transmission apparatus, a data manipulation transmission method, and a data manipulation transmission program, specifically relates to a data manipulation transmission apparatus, a data manipulation transmission method, and a data manipulation transmission program for transmitting a data to display a display object on a common display apparatus.

BACKGROUND OF THE INVENTION

In conferences within a company and small-scale meetings, participants may often times perform jotting and briefing work at hand. In these cases, a Post-It® (tag), as an example, is often used as a tool to share, by all participants, a memo and/or brief generated by a participant.

Incidentally, a projection system and a projection device have been known, which magnify and project a part of a display image displayed on a display screen of a personal digital assistance, by using a projection device such as a projector, or the like (refer to Japanese Patent Application Publication No. 2007-241537).

Also, an image data transmission/reception system, which is an image data transmission/reception system pertinent to generation of a display image to be displayed on a display screen of a personal digital assistance, has been known, in which a personal digital assistance transmits a request for a specific symbol image data constituting a part of display image, to be displayed on a display screen of the personal digital assistance, and resolution related information pertinent to resolution of that display screen, and a server sends back, to the personal digital assistance, a symbol image data in accordance with the resolution based on the received resolution related information (refer to Japanese Patent Application Publication No. 2005-128801).

Further, an image display apparatus has been known, which generates an image by receiving information described in a structure description language via a network, and generates a display image of the full scale of the generated image and a display image in a display size which is smaller than the full scale (refer to Japanese Patent Application Publication No. 2002-182638).

Further, an electronic conferencing system has been known, which can record, as image data, written content written by a user, and can incorporate the image data, by reading out the image data, into other image data as tag image data (refer to Japanese Patent Application Publication No. 2007-286780).

Further, a display apparatus has been known, which is provided with a photographing section on a display screen, and photographs a plurality of people via the photographing section, and determines a display magnification (scaling factor for display) of the photographed image, to be displayed on the display screen, by measuring each distance between the photographing section and the plurality of people and using each of the measured distances having been measured (refer to Japanese Patent Application Publication No. 2009-63636).

In the cases of Post-it which is used by a user at hand, because it is adhered with the current size, it is very difficult to see since the written characters are small, when viewing the Post-it from a distance. Also, an electronic conferencing system is disclosed in Japanese Patent Application Publication No. 2007-286780, which utilizes tag image data which is applicable as a Post-it.

However, in the electronic conferencing system, disclosed in Japanese Patent Application Publication No. 2007-286780, tag image data is to be displayed basically at the same magnification, and therefore, it is difficult for a person, who is far away from the display apparatus, to read the tag image data because the tag image data is small.

Also, a display apparatus is disclosed in Japanese Patent Application Publication No. 2009-63636, in which, by photographing a plurality of people from a display screen, the distances from the display screen to the people are measured, and display magnification is determined in accordance with the measured distances.

However, the display apparatus, disclosed in Japanese Patent Application Publication No. 2009-63636, is to determine display magnification (scaling factor for display) so that it becomes easier for a plurality of participants to see the display screen, and therefore, no study or consideration has been done with regard to the display of a memo, brief, or the like, generated by a user.

SUMMARY OF THE INVENTION

The present invention has been achieved in consideration of the above problems, and it is one of the main objects to realize a data manipulation transmission apparatus which is capable of displaying an object, generated via an information processing device (information input device) manipulated by the user and displayed on a common display apparatus, in an easily viewable display size even from a location away from the common display apparatus.

The above object of the present invention can be attained by the following data manipulation transmission apparatus to which one aspect of the present invention is reflected.

[1] A data manipulation transmission apparatus reflecting one aspect of the present invention includes, but is not limited to: a) an object acquisition section for acquiring a display object, having been generated on a display screen of an information input device based on an input to the information input device, from the information input device which is manipulated by an individual; b) a distance information acquisition section for acquiring a distance information from a display screen of a common display apparatus to a person who views the display screen of the common display apparatus when viewed by a plurality of people; c) a display ratio determining section for determining a ratio of a display size of an arbitrary display object on the display screen of the common display apparatus, to a display size of the arbitrary display object on the display screen of the information input device, in accordance with the distance information; and d) a display data transmission section for generating a data to display a display object, having been acquired via the object acquisition section, on the display screen of the common display apparatus, at a ratio, having been determined via the display ratio determining section, and transmitting the data to the common display apparatus.

[2] The data manipulation transmission apparatus described in [1], reflecting another aspect of the present invention, wherein the distance information acquisition section is configured to acquire a distance information from the display screen of the common display apparatus to a person who views the display screen of the common display apparatus at a position farthest away from the display screen of the common display apparatus.

[3] The data manipulation transmission apparatus described in [1], reflecting still another aspect of the present invention, wherein, in a case in which a plurality of people views the display screen of the common display apparatus, the distance information acquisition section is configured to acquire an average distance information from the display screen of the common display apparatus to the people who view the display screen.

[4] The data manipulation transmission apparatus described in [1], reflecting still another aspect of the present invention, wherein the distance information acquisition section is configured to acquire, from a plurality of different measurement points having been provided on the common display apparatus, respectively, a distance information from the display screen of the common display apparatus to people who view the display screen of the common display apparatus, and the distance information acquisition section is configured to control the display ratio determining section to determine the ratio based on a distance information of a maximum distance among the acquired distance information.

[5] The data manipulation transmission apparatus described in [4], reflecting another aspect of the present invention, wherein the distance information acquisition section is configured to: a) acquire a distance information from a plurality of different measurement points, having been provided on the common display apparatus, to people who view the display screen of the common display apparatus at each of positions farthest away from the plurality of different measurement points; and b) control the display ratio determining section to determine the ratio at each of the plurality of different measurement points based on a distance information of a maximum distance among the acquired distance information, and wherein, when displaying an arbitrary display object on the display screen of the common display apparatus, the display data transmission section is configured to: a) generate data to display the arbitrary display object at the ratio of a measurement point closest to a position where the arbitrary display object is displayed; and b) transmit the data to the common display apparatus.

[6] The data manipulation transmission apparatus described in [1], reflecting still another aspect of the present invention, wherein the distance information acquisition section is configured to acquire a distance information from the display screen of the common display apparatus to a depth of a room where the common display apparatus is placed, or to a position where a chair is arranged of a chair, as the distance information.

[7] The data manipulation transmission apparatus described in [1], reflecting still another aspect of the present invention, wherein the distance information acquisition section is configured to acquire a device distance information from the common display apparatus to the information input device, as the distance information.

[8] The data manipulation transmission apparatus described in [1], reflecting still another aspect of the present invention, wherein the distance information acquisition section is configured to acquire a user distance information from a user, who manipulates the information input device, to the information input device, and wherein the display ratio determining section is configured to determine a ratio of a display size of an arbitrary display object on the display screen of the common display apparatus, to a display size of the arbitrary display object on the display screen of the information input device, based on a ratio of a distance indicated by a user distance information, having been acquired via the distance information acquisition section, to the distance information.

[9] The data manipulation transmission apparatus described in [1], reflecting still another aspect of the present invention, wherein the display ratio determining section is configured to: a) distinguish a character data in a display object, having been acquired via the object acquisition section; and b) determine a ratio of a character size on the display screen of the common display apparatus, to a character size on the display screen of the information input device, with respect to the distinguished character data, based on the distance information, and wherein the display data transmission section is configured to: c) generate a data to display only the character data in the display object, having been acquired via the object acquisition section, on the display screen of the common display apparatus based on the ratio having been determined via the display ratio determining section, and d) transmit the data to the common display apparatus.

[10] The data manipulation transmission apparatus described in [1], reflecting still another aspect of the present invention, wherein the display ratio determining section is configured to: a) distinguish a character data in a display object, having been acquired via the object acquisition section; and b) determine a ratio of a character size on the display screen of the common display apparatus, to a character size on the display screen of the information input device, with respect to the distinguished character data, based on the distance information, and wherein the display data transmission section is configured to: c) generate a data to display an entity of the display object, having been acquired via the object acquisition section, on the display screen of the common display apparatus based on the ratio having been deter mined via the display ratio determining section; and d) transmit the data to the common display apparatus.

[11] The data manipulation transmission apparatus described in [1], reflecting still another aspect of the present invention, wherein the display ratio determining section is configured to: a) determine a size of a character, to be displayed on the display of the common display apparatus, as a character size corresponding to a distance indicated by the distance information; and b) control the display data transmission section to generate a data to display the display object on the display screen in such a manner that the size of the character in the display object becomes the character size having been determined.

[12] The data manipulation transmission apparatus described in [1], reflecting still another aspect of the present invention, wherein the display ratio determining section is configured to determine a display size of display object on the display screen of the common display apparatus in accordance with the distance information from the display screen of the common display apparatus, as a substitute for the ratio, and wherein the display data transmission section is configured to: a) generate a data to display the display object, having been acquired via the object acquisition section, in the display size having been determined via the display ratio determining section, as a substitute for generating the data based on the ratio; and b) transmit the data to the common display apparatus.

[13] The data manipulation transmission apparatus described in [1], reflecting still another aspect of the present invention, wherein the display data transmission section is configured to: a) set an appropriate size range when displaying an arbitrary object on the display screen of the common display apparatus based on a size of the display screen of the common display apparatus, and in a case in which a display size, with which the display object, having been acquired via the object acquisition section, is displayed in the ratio, having been determined via the display ratio determining section, deviates from the appropriate size range; b) generate the data to display the display object on the display screen of the common display apparatus after adjusting in such a manner that the display size of the display object becomes to be within the appropriate size range; and c) transmit the data to the common display apparatus.

[14] The data manipulation transmission apparatus described in [1], reflecting still another aspect of the present invention, wherein the display data transmission section is configured to: a) transmit the data, having been generated, to the common display apparatus to display an arbitrary display object; and b) receive an instruction, from a user who manipulates the information input device, to increase or decrease the display size.

[15] The data manipulation transmission apparatus described in [1], reflecting still another aspect of the present invention, wherein the display data transmission section is configured to: a) transmit the data having been generated, to the common display apparatus to display an arbitrary display object; and b) receive an instruction, from a user who manipulates the information input device, to enlarge or reduce the display object, which the information input device has controlled the common display apparatus to display, with respect to each of the information input device.

[16] The data manipulation transmission apparatus in described in [1], reflecting still another aspect of the present invention, wherein a data which the display data transmission section generates, comprises a ratio having been determined via the display ratio determining section, and wherein the display data transmission section is configured to: a) generate a data having the display object, having been acquired via the object acquisition section, enlarged or reduced based on the ratio; and b) trans the data to the common display apparatus.

[17] The data manipulation transmission apparatus described in [1], reflecting still another aspect of the present invention, wherein a data which the display data transmission section generates, comprises a data which is made by adding an information, to the display object having been acquired via the object acquisition section, for displaying the display object in the ratio which the display ratio determining section has determined

[18] A nontransitory computer-readable recording medium recorded therein a program to execute procedures of a data manipulation transmission apparatus reflecting one aspect of the present invention, the procedures include, but is not limited to: a) an object acquiring procedure of acquiring a display object, having been generated on a display screen of an information input device based on an input to the information input device, from the information input device which is manipulated by an individual; b) a distance information acquiring procedure of acquiring a distance information from a display screen of a common display apparatus to a person who views the display screen of the common display apparatus when viewed by a plurality of people; c) a display ratio determining procedure of determining a ratio of display size of an arbitrary display object on the display screen of the common display apparatus, to a display size of the arbitrary display object on the display screen of the information input device, in accordance with the distance information; and d) a display data transmitting procedure of generating a data to display a display object, having been acquired by the object acquisition section, on the display screen of the common display apparatus, at a ratio, having been determined via the display ratio determining section, and transmitting the data to the common display apparatus.

BRIEF DESCRIPTION OF THE DRAWINGS

The preferred embodiments of the present invention are shown by way of example, and not limitation, in the accompanying figures, in which:

FIG. 9 is an explanatory diagram illustrating a distance-to-size conversion table which indicates an example in which a distance from a viewer to a common display apparatus is converted into a display size.

FIG. 11 is an explanatory diagram illustrating a distance-to-character size conversion table which shows an example in which a distance from a viewer to a common display apparatus is converted into a display size.

DETAILED DESCRIPTION OF THE PREFERRED EMBODIMENTS

First Preferred Embodiment

Hereinafter, preferred embodiments of the present invention will be described in detail with reference to the accompanying drawings, without the present invention being limited to the embodiments.

Figure 1:
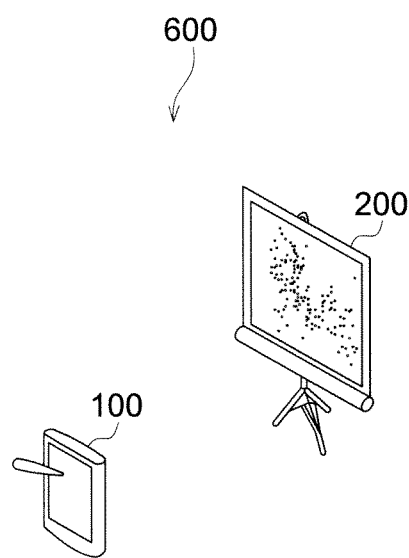
FIG. 1 is an explanatory diagram illustrating an example of an electronic conferencing system according to a first preferred embodiment of the present invention.

FIG. 1 is an explanatory diagram illustrating an example of electronic conferencing system 600 according to a first preferred embodiment of the present invention. Electronic conferencing system 600 is provided with hand-held device (information input device) 100 and common display apparatus 200.

Hand-held device 100 is an information input device which is manipulated by a user, and is a tool such as, for example, a PDA (Personal Digital Assistant), a Tablet PC (Tablet Personal Computer), or the like. When hand-held device 100 has generated a part (also referred to as a display object) consisting characters and/or graphics, hand-held device 100 transmits the part, having been generated, to common display apparatus 200.

Common display apparatus 200 is a display apparatus such as a common screen (for example, a LCD (Liquid Crystal Display), a projector, or the like) which can be viewed by a plurality of users. When common display apparatus 200 has received a part from hand-held device 100, common display apparatus 200 displays the part, having been received from hand-held device 100 on the common screen. In the case of electronic conferencing system 600, according to this preferred embodiment, the size of the part, having been received from hand-held device 100, is enlarged or reduced by a display magnification ratio (ratio) in accordance with a distance from the common display apparatus to the viewer who views the display. In other words, when electronic conferencing system 600 displays a part generated via hand-held device 100, electronic conferencing system 600 displays the part after enlarging/reducing the part by a display magnification ratio (ratio) in accordance with a distance from the common display apparatus to the viewer who views the display.

Figure 2:
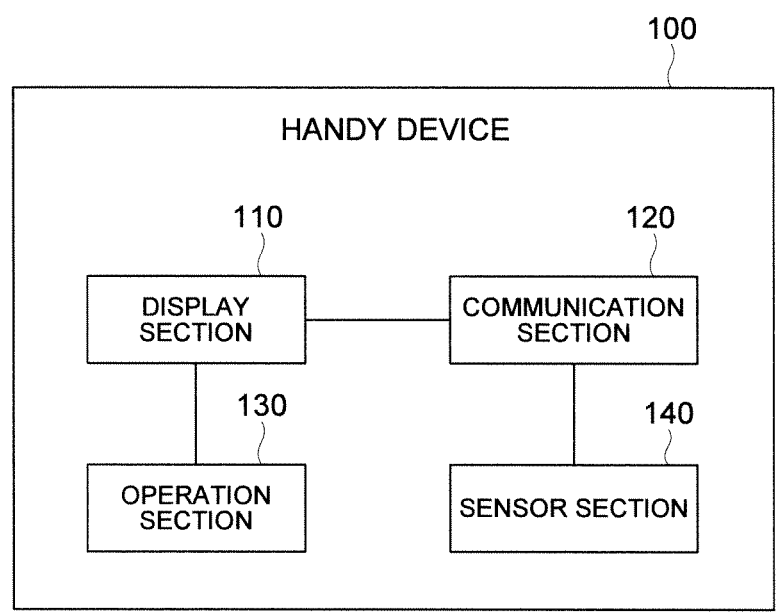
FIG. 2 is a block diagram illustrating a hand-held device.

FIG. 2 is a block diagram illustrating hand-held device 100. Hand-held device 100 consists of display section 110, communication section 120, operation section 130, and sensor section 140.

Display section 110 is constituted in such a way that a touch panel is provided on the surface of a liquid crystal display. Display section 110 is configured to receive input, such as a character, a graphic, a symbol, or the like, fed in by the user via a pen or a finger while displaying the content of the input on a real-time basis. Also, display section 110 is configured to be capable of displaying text data, image data, and the like.

Operation section 130 has functions for receiving operations from a user, and is provided with operation buttons which are selected via a depressing operation, buttons which are used for selecting a mode, and the like.

Sensor section 140 is composed of a human body detection sensor using an infrared sensor, and is configured to project light to detect a distance to a human body via reflected light. Sensor section 140 is configured to calculate a distance from hand-held device 100 to the user who uses hand-held device 100, and the details of which will be described later. Also, sensor section 140 is composed of sensor 141 which will be described later, and the preferred embodiment will be described by using sensor 141 as an example of sensor section 140.

Communication section 120 has wireless communication functions to communicate with common display apparatus 200. Communication section 120 is configured to perform functions to transmit, to common display apparatus 200, data of a part having been generated via display section 110 and distance information of the distance to the user, who has been detected via sensor section 140. It is to be noted that it is only necessary for communication section 120 to have a communication function. It is not limited to wireless communication, and wired communication, connected via a LAN (Local Area Network) cable, or the like, may be applied.

Figure 3:
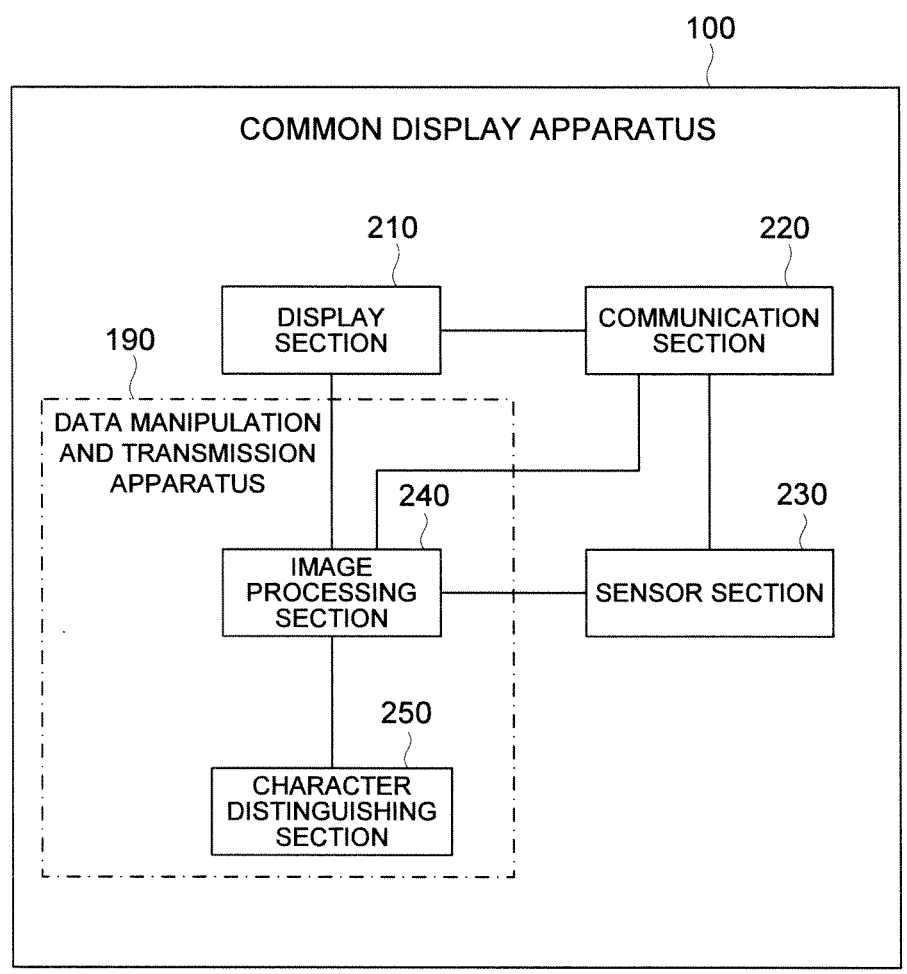
FIG. 3 is a block diagram illustrating a common display apparatus.

FIG. 3 is a block diagram illustrating common display apparatus 200. Common display apparatus 200 is provided with display section 210, communication section 220, sensor section 230, image processing section 240, and character distinguishing section 250.

Display section 210 forms a common screen for displaying a part (display object), having been acquired from hand-held device 100, so that the user and viewers can view the part. Display section 210 is composed of a large-size liquid crystal display, a projector, or the like.

Communication section 220 has wireless communication functions for communicating with hand-held device 100. Communication section 220 is configured to receive, from hand-held device 100, data of a part, information of the distance from hand-held device 100 to the user, and the like. It is to be noted that it is only necessary for communication section 220 to have a communication function. It is not limited to wireless communication, and wired communication, connected via a LAN cable, may be applied.

Sensor section 230 is composed of a human body detection sensor or an object detection sensor, which uses an infrared sensor, and is configured to project light to measure a distance to a human body or an object via the reflected light. Sensor section 230 is configured to acquire distance information such as the distance from said sensor section 230 to the viewer who views display section 210 (hereinafter, the distance is referred to as observation distance), the distance to the depth of room inside of the conference room, and the distance to a position where a chair is arranged, and the like. The details of the distance information to be acquired will be described later. Also, sensor section 230 is composed of sensor sections 231-234, which will be described later, and the preferred embodiment will be described by using sensors 231-234 as an example of sensor section 230.

Image processing section 240 is configured to calculate, based on the distance information having been acquired via sensor section 230, the ratio of the display size of a part, on display section 210 of common display apparatus 200, to the display size of the part on display section 110 of hand-held device 100, and displays the part on display section 210 by scaling the part in accordance with the ratio. It should be noted that distance information from display section 210 to a person farthest away (herein after, the person is referred to as farthest viewer) may be used as the distance information used to determine the ratio, or an average distance from display section 210 to people who view display section 210 may be used.

Character distinguishing section 250 is configured to distinguish the character portion in the part acquired from hand-held device 100, and to extract data (character data) of the character portion. In general, an enlargement process or reduction process is performed for the whole of a part by using the ratio having been calculated via image processing section 240. However, there is a case in which the enlargement process or reduction process is preferably performed only for the character data, and in that case, character distinguishing section 250 extracts character data from the part. Character distinguishing section 250 is configured to control image processing section 240 to perform the enlargement process or reduction process on the extracted character data by using the ratio having been calculated via image processing section 240. The character data to which enlargement process or reduction process has been performed is transmitted to display section 210 from image processing section 240, and displayed on display section 210. In this case, image processing section 240 has instructed display section 210 to superimpose character data, to which enlargement process or reduction process has been performed, onto the part before character data is extracted, and has adjusted overlapping or misalignment of character and graphics caused by the enlargement process or reduction process when displaying the part on display section 210. In such a way, because character distinguishing section 250 can extract character data from a part, character distinguishing section 250, it makes possible for image processing section 240 to perform an enlargement process or reduction process only on the character data having been extracted. It should be noted that the functions of image processing section 240 and character distinguishing section 250 constitute the functions of data manipulation transmission apparatus 190 which is described below.

Figure 4:
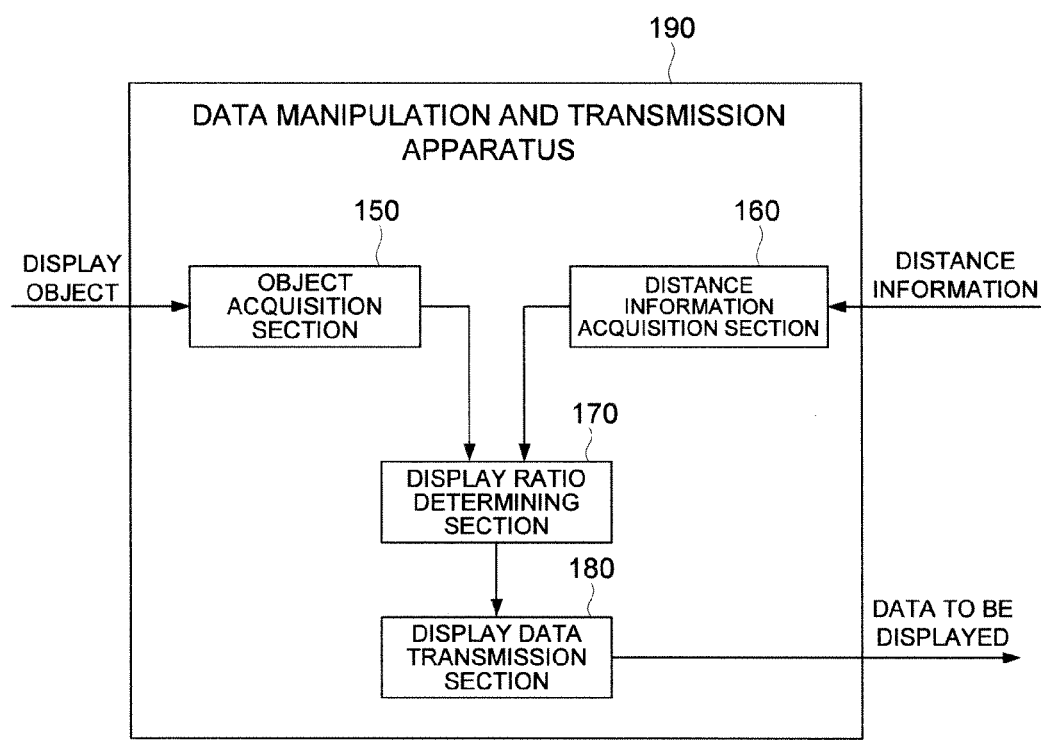
FIG. 4 is a functional block diagram illustrating a data manipulation transmission apparatus composed of an image processing section and a character distinguishing section.

FIG. 4 is a functional block diagram illustrating data manipulation transmission apparatus 190 composed of image processing section 240 and character distinguishing section 250. Data manipulation transmission apparatus 190, illustrated in FIG. 4, consists of object acquisition section 150, distance information acquisition section 160, display ratio determining section 170, and display data transmission section 180. Here, object acquisition section 150, distance information acquisition section 160, display ratio determining section 170, and display data transmission section 180 correspond to the functions of the above-described image processing section 240. Also, display ratio determining section 170 includes the functions of character distinguishing section 250.

Object acquisition section 150 is configured to acquire the part (display object), which has been generated on the display screen (display section 110) of hand-held device 100 based on input to hand-held device 100 which is manipulated by an individual, from hand-held device 100 via communication section 220.

Distance information acquisition section 160 is configured to acquire distance information from the display screen (display section 210) of common display apparatus 200 to a person who views the display screen when viewed by a plurality of people.

Display ratio determining section 170 is configured to determine the ratio of the display size of an arbitrary part on the display screen of common display apparatus 200, to the display size of the part on the display screen of hand-held device 100, based on the distance information which has been acquired via distance information acquisition section 160.

Display data transmission section 180 is configured to generate data to display the display object, which has been acquired by object acquisition section 150, on the display screen of common display apparatus 200, at the ratio which has been determined via display ratio determining section 170, and to transmit the data to common display apparatus 200.

In such a way, data manipulation transmission apparatus 190 can display the part, onto which image processing at a ratio, which has been determined via display ratio determining section 170, has been performed, on display section 210 of common display apparatus 200, by generating data to be displayed on the display screen of common display apparatus (hereinafter the display screen is referred also to as common screen) and transmitting the data to display section 210.

Next, operations of electronic conferencing system 600 by hand-held device 100 and common display apparatus 200 will be described in detail.

<Basic Operations of Electronic Conferencing System 600>

Figure 5:
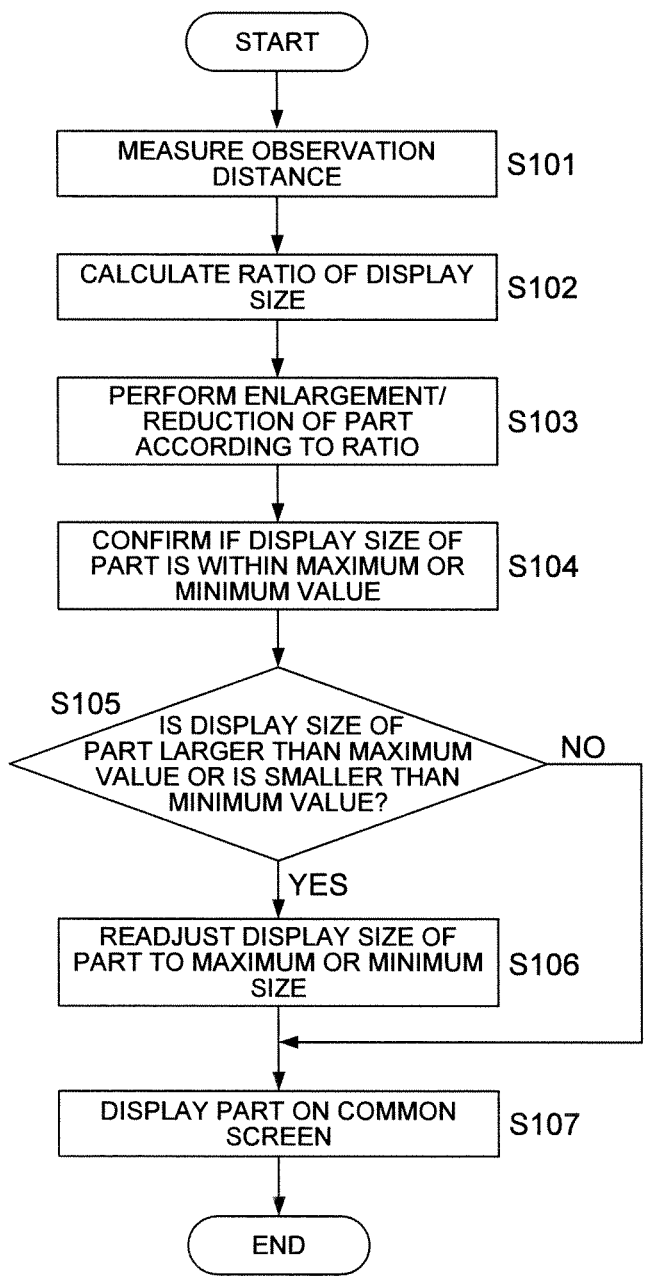
FIG. 5 is a flow chart illustrating a flow of basic operations of the electronic conferencing system according to the first preferred embodiment.

FIG. 5 is a flow chart illustrating a flow of basic operations of electronic conferencing system 600 according to the first preferred embodiment First, common display apparatus 200 measures the observation distance from display section 210 to the person farthest away from display section 210 (farthest viewer as previously described) among the people who view the common screen, by using sensor 231 (refer to FIG. 6 which will be described later) which has been installed in the common display of display section 210 (step S101). It is to be noted that the number of people who view the common screen may be any number in this preferred embodiment, and it is only necessary for common display apparatus 200 to be able to measure the observation distance of the farthest viewer among the people who view the common screen. Common display apparatus 200 in this case is described with reference to the accompanying drawings.

Figure 6:
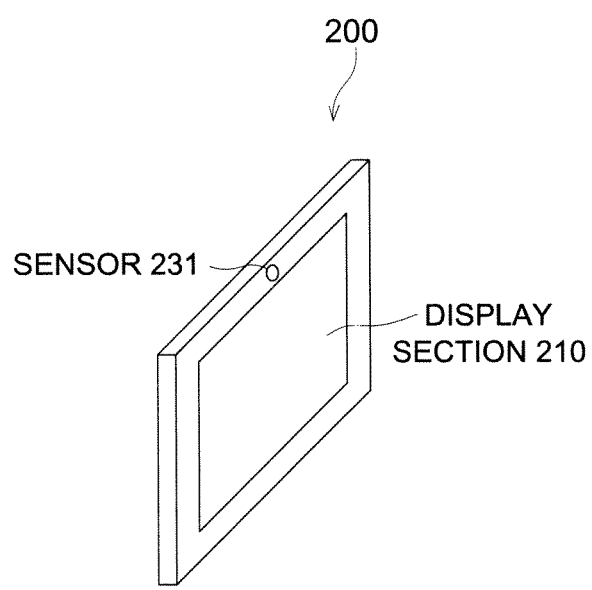
FIG. 6 is an explanatory diagram illustrating a case in which the common display apparatus is provided with a sensor and a display section.

FIG. 6 is an explanatory diagram illustrating a case in which common display apparatus 200 is provided with sensor 231 and display section 210. Sensor 231 is installed at a position of the top portion of display section 210, and the distances from the position of said sensor 231 to people who view display section 210 are measured. Also, display section 210 is provided in common display section 200, and displays text data and image data, or read-only data, or the like, generated via hand-held device 100 of people who view the common screen.

Next, the ratio of the display size of the part displayed on display section 110, to the display size of the part displayed on display section 210 is calculated (step S102). A method of calculation of the ratio is described with reference to the accompanying drawings.

Figure 7:
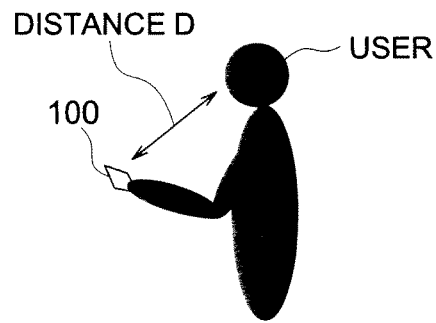
FIG. 7 is an explanatory diagram illustrating a state in which a user uses a hand-held device.

FIG. 7 is an explanatory diagram illustrating a state in which a user uses hand-held device 100. The user holds hand-held device 100 in the hands, and the distance from the user to hand-held device 100 is distance D (hereinafter distance D is referred also to as user distance).

Figure 8:
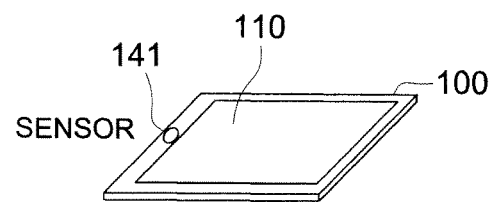
FIG. 8 is an explanatory diagram illustrating the hand-held device used by the user.

FIG. 8 is an explanatory diagram illustrating hand-held device 100 used by the user. Sensor 141 is provided to hand-held device 100 illustrated in FIG. 8. The screen size of display section 110 is the size of a business card (approximately 91 mm×55 mm) in this preferred embodiment. Also, display section 110 is provided with a liquid crystal display with touch panel functions.

It should be noted that, in this preferred embodiment, when a confirm button (or transmission button) for a part is operated, the entire displayed content of display section 110 of hand-held device 100 becomes a part. Therefore, the display size of the part coincides with the screen size of hand-held device 100. In addition, the embodiment may be configured in such a way that the display content, within a range which the use arbitrarily selected on the display screen, is treated as a part.

In the first preferred embodiment, calculated is the ratio of distance D which is viewing distance at which the user views hand-held device 100, to the distance from the common screen of common display apparatus 200 to the farthest viewer who views display section 210 of the common screen, among the people who view the common screen of common display apparatus 200. In other words, obtained is the ratio of distance D which is viewing distance at which the user views hand-held device 100, to the distance from the common screen to the farthest viewer, among the people who view the common screen.

Specifically, for example, in a case in which distance D between the user and hand-held device 100 is 0.5 m, and the distance from the common screen to the farthest viewer who views the common screen is 2 m, the ratio is quadrupled.

In accordance with the ratio of calculated distances, the part, having been displayed on display section 110, is enlarged or reduced (step S103). In other words, by using the quadrupled ratio which has been calculated as described above, the part, having been displayed on display section 110, is enlarged at a factor of four and is displayed on display section 210. It should be noted that the display size of a part to be displayed on the common screen can be adjusted by multiplying the calculated ratio by an appropriate value as an adjusting value. For example, because the ratio of the above calculated result is quadrupled, the part, having been displayed on display section 110, is enlarged at a factor of four and displayed on display section 210, which may sometimes be too large. Therefore, it may be readjusted by multiplying 0.5, as an adjusting value, so that the part is enlarged at a factor of two and displayed on display section 210.

Also, an average distance to all people may be applied instead of the distance to the farthest person such as the farthest viewer. This is because the enlarged part may sometimes be too large for the people who are close to the common screen. Therefore, by using an average distance of the people who view the common screen, the part can be set to a size for easy viewing by all the participants.

Next, it is confirmed whether or not the display size of the part, having been displayed on the common screen, is within the range of an appropriate size range which is indicated by a maximum value or a minimum value (step S104). First, it is determined whether or not the display size of the part to be displayed on the common screen is larger than a predetermined maximum size, or is smaller than a predetermined minimum size (step S105). In a case in which the display size of the part to be displayed on the common screen is larger than the predetermined maximum size or is smaller than the predetermined minimum size (step S105: YES), the display size of the part to be displayed on the common screen is readjusted either to the maximum size or to the minimum size (step S106). In other words, in a case in which the display size of a part to be displayed on the common screen is larger than a predetermined maximum size, the display size of the part to be displayed on the common screen is readjusted to the predetermined maximum size, and in a case in which the display size of a part to be displayed on the common screen is smaller than a predetermined minimum size, the display size of the part to be displayed on the common screen is readjusted to the predetermined minimum size.

Hereinafter, a concrete example of the case will be described, in which the maximum size (area), which is the maximum value, is calculated.

For example, it is assumed that the size of the common screen (display section 210) is 60 inches, and the aspect ratio is 16 to 9 (namely, 1,328 mm×747 mm). In this case, if the maximum size of the part to be displayed on the common screen is set to 10% of the area of the common screen, the maximum size of the part becomes 1,328×747×0.1=99,201.6 (mm$^2$). This calculated area becomes the maximum value on display section 210.

Meanwhile, in step S103, the display size on display section 110, after having been enlarged at factor of two, becomes (91 mm×2)×(55 mm×2)=22,020 mm$^2$. In this example, since the display size does not exceed the maximum value which has been calculated as described above (step S105: NO), the part is displayed on the common screen of display section 210 with the display size after enlargement (step S107).

In contrast to this, the display size on display section 110, after having been enlarged at a factor of five, for example, becomes (91 mm×5)×(55 mm×5)=125,125 mm$^2$ in step S103. In this case, because the display size exceeds the maximum value which has been calculated as described above (step S105: YES), the display size is readjusted so that it becomes the above-described area of the maximum value (step S106). Because the magnification ratio to be adjusted in this case becomes (99,201.6)/(91×55)=(the magnification ratio)×(the magnification ratio), it is preferable to enlarge the part at a factor of approximately 4.45, and the part is displayed on the common screen of display section 210 with the display size after having been enlarged at a factor of approximately 4.45 (step S107).

It is to be noted that explanations about the minimum value are omitted because it can be calculated by a calculation method similar to the method used for the maximum value.

In such a way, in the first preferred embodiment, by calculating the ratio of the distance between hand-held device 100 and the user, to the distance between the common screen and the farthest viewer who views the common screen, the part, having been displayed on display section 110, is enlarged at the calculated ratio. In other words, in the relationship between the display size of the time when a user has generated a part on display section 110 by using hand-held device 100, and distance D (refer to FIG. 7) of the time when the part has been generated, there is a tendency in which the part is generated smaller on display section 110 when the distance is smaller, and is generated larger on display section 110 when the distance is greater, and therefore, the size for easy viewing may vary depending on the user who has generated the part. Thus, by enlarging the part to the size for easy viewing for the user who has generated the part, the part can be displayed on the common screen with the display size of the enlarged part.

Second Preferred Embodiment

In the first preferred embodiment described above, the display size of a part on the display screen of common display apparatus 200 is adjusted based on the ratio of the distance between hand-held device 100 and the operator (user), to the distance between the common screen of common display apparatus 200 and the viewer who views the common screen, and then it is determined whether or not the display size is within an appropriate size range. In a second preferred embodiment, the display size of a part on the common screen is determined by calculating the display size from the distance between a person and the common screen in accordance with distance-to-size conversion table 500 based on the distance from a viewer to the common screen of common display apparatus 200.

FIG. 9 is an explanatory diagram illustrating distance-to-size conversion table 500 which indicates an example in which the distance from a viewer to a common display apparatus is converted into a display size. Distance-to-size conversion table 500, illustrated in FIG. 9, is composed of a field of distance (m) and a field of size (area: mm$^2$). In the table, the display size of a part is calculated from the screen size of display section 110 of hand-held device 100 as a base in accordance with distance (m) from the common screen. Here, it is set that the screen size of the hand-held device is a business card size (91 mm×55 mm=5,005 mm$^2$), and that the display size of a part to be displayed on the common screen is the business card size (standard) when the distance between the viewer and the common screen is 1 m. Therefore, the display size of a part is 91 mm×55 mm=5,005 mm$^2$ in the case of 1 m, (91 mm×2)×(55 mm×2)=20,020 mm$^2$ in the case of 2 m, (91 mm×3)×(55 mm×3)=45,045 mm$^2$ in the case of 3 m, (91 mm×4)×(55 mm×4)=80,080 mm$^2$ in the case of 4 m, (91 mm×5)×(55 mm×5)=125,125 mm$^2$ in the case of 5 m, - - - . It should be noted that the numerical values used in FIG. 9 are not fixed values, and may be variable setting values which the user can set appropriately. Also, because the screen size (the display size in this case) of hand-held device 100 may vary from one to another, the business card size is set as a standard in this preferred embodiment, but it is not limited to that size.

Hereinafter, the second preferred embodiment will be described in detail by using distance-to-size conversion table 500 illustrated in FIG. 9.

Figure 10:
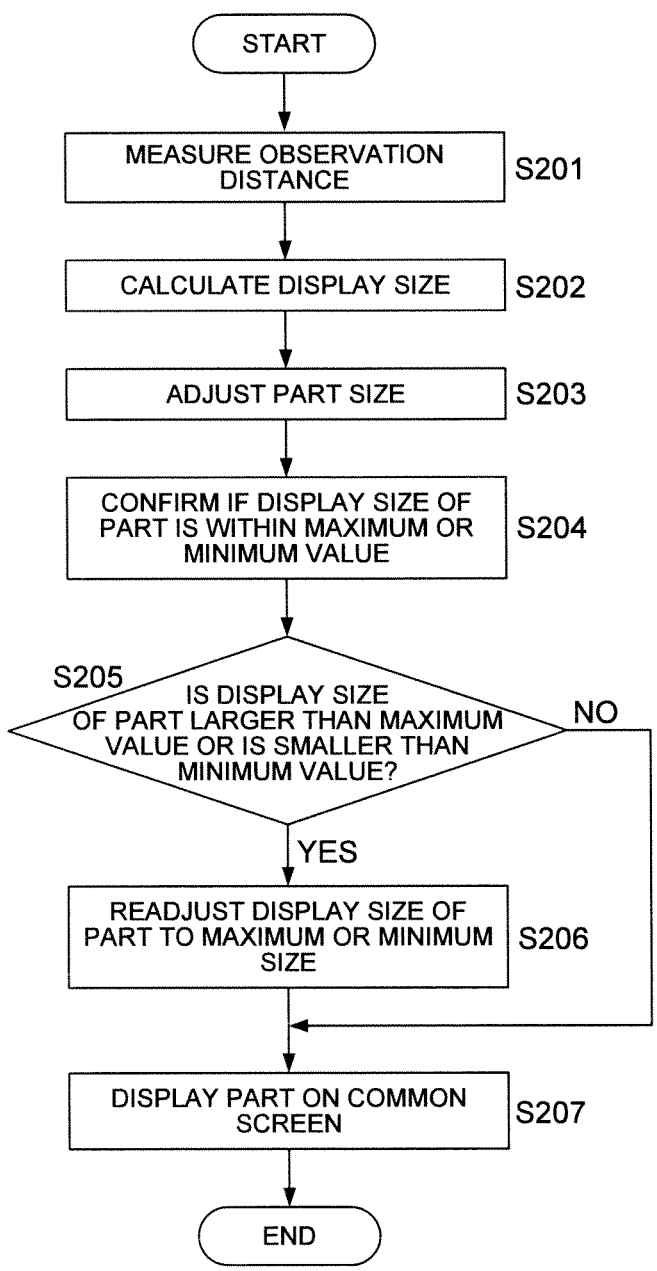
FIG. 10 is a flow chart illustrating a flow of operations of an electronic conferencing system according to a second preferred embodiment.

FIG. 10 is a flow chart illustrating a flow of operations of electronic conferencing system 600 according to the second preferred embodiment. Although the operations are explained in steps S201 to S207 in FIG. 10, the operations which are different from the operations according to the first preferred embodiment are steps S202 and S203, and other steps are the same as those in the first preferred embodiment, and not described below. Therefore, steps S202 and S203 will be described.

In step S202, the display size of a part on the common screen is calculated based on the observation distance from display section 210 (common screen) of common display apparatus 200 to the farthest viewer (the person who is farthest away). Specifically, by using FIG. 9, display size corresponding to the distance between the person and the common screen is obtained (step S202). Then, the size of the part (magnification ratio) is adjusted so that the part is displayed by the display size (step S203).

The size adjustment of the part is carried out in such a manner that the magnification ratio is obtained from the display size (area) on the common screen, and the lengths of the long side and the short side of the part on display section 110 of hand-held device 100, and then the adjustment is carried out accordingly. In other words, the magnification ratio is obtained from the following calculations.

(The length of the long side after size adjustment)
=square root of (area×the length of the long side/
the length of the short side)          (1)

(Magnification ratio)=(the length of the long side after
size adjustment)/(the length of the long side)          (2)

In the above calculations, the magnification ratio is obtained so that, regardless of whether the part on display section 110 of hand-held device 100 is a square, or an arbitrary rectangular shape, the display size (area) of the part on the common display apparatus becomes the area which has been defined in accordance with the observation distance.

Here, an example of the calculation of the magnification ratio will be described below.

For example, it is assumed that the distance between a person (farthest viewer) and the common screen is 2 m, and the screen size of display section 110 (the part size on display section 110) of hand-held device 100 is 91 mm×55 mm. By using distance-to-size conversion table 500 illustrated in FIG. 9, the display size (area) is obtained as 20,020 mm². In this case, the length of the long sides of the part (the length of the long sides after size adjustment) is obtained from formula (1) below:

(The length of the long sides after size adjustment)
=square root of (20,020 mm²×91 mm/55
mm)=182 mm          (3)

Then, the magnification ratio (enlargement ratio) of the length of the long sides is obtained from formula (2) below:

(The magnification ratio)=182/91=2 times

Therefore, the original size is enlarged at a factor of two, and is displayed.

In steps S204 to S206, determination on the predetermined maximum and minimum sizes of the display size and readjustment as necessary are carried out in a similar fashion as the first preferred embodiment. It should be noted that this preferred embodiment is not limited to this flow of operations, and a display size that takes into consideration the limitation of the maximum and minimum sizes may be set in advance when the display size has been calculated in step S202. Specifically, for example, the area of the maximum size to be displayed on the common screen is calculated by setting the maximum size as 10% of the common screen size, in a similar fashion as the above-described maximum size of the display size is calculated, and in a case in which the maximum size exceeds the display size of a part, which has been calculated in step S202, the maximum size may be applied as the display size of the part.

Also, although the magnification ratio is to be adjusted with respect to the whole of a part (display object) on display section 110 in step S203, this preferred embodiment is not limited to this, and by distinguishing character data contained in a part, the size adjustment may be carried out only with respect to the character data contained in the part. In this case, the display size to be set becomes the display size of the part.

FIG. 11 is an explanatory diagram illustrating distance-to-character size conversion table 510 which shows the correspondence relation between the distance from a viewer to the common screen, and the size of the character. Distance-to-character size conversion table 510, illustrated in FIG. 11, consists of the field of distance (m) and the field of the longitudinal character size (mm). This table converts the longitudinal dimension of character size, to be displayed on the common screen, in accordance with the distance (in meters) from the common screen. In other words, the longitudinal dimension of character size is determined as 10 mm in the case of 1 m, 20 mm in the case of 2 m, 30 mm in the case of 3 m, 40 mm in the case of 4 m, and 50 mm in the case of 5 m. It should be noted that the longitudinal length is only defined because the aspect ratio will be changed if the lateral dimension is determined. Also, the numerical values used in FIG. 11 are not fixed values, and may be variable setting values which the user can set as appropriate.

For example, in the case in which the distance between the common screen and a viewer is 2 m, the character size becomes 20 mm in length. The character data is displayed by adjusting the character size in accordance with the size. When a character of original size of 8 mm×8 mm is to be enlarged, the enlargement ratio becomes 20/8=2.5 times. Therefore, the character data, having been displayed on display section 110 of hand device 100, is to be enlarged at a factor of 2.5, and only the enlarged character data is displayed on the common screen of display section 210. Also, in this preferred embodiment, it is not limited to the enlargement of character data only, the whole of the part on display section 110 may be enlarged by using the enlargement ratio calculated from the size of character. Furthermore, in the preferred embodiment, the character size may be adjusted for each character by calculating the enlargement ratio for each character, or may also be adjusted for each word or each sentence.

As described above, in the above-described first preferred embodiment and second preferred embodiment, in the case of common display apparatus 200, which includes data manipulation and transmission apparatus 190, object acquisition section 150 acquires a part on display section 110 of hand-held device 100, distance information acquisition section 160 acquires distance information from the common screen of common display apparatus 200 to the viewer, and display ratio determining section 170 determines the ratio of the display size of an arbitrary part on display section 210, to the display size of the arbitrary part on display section 110.

Therefore, because the part, generated via hand-held device 100 manipulated by the user, is optimized and displayed on the common screen of common display device 200, a person who views the common screen of common display apparatus 200, even the person farthest away from the common display apparatus (farthest viewer), can view the part displayed in an easily viewable display size on the common screen.

Also, in the first preferred embodiment, by considering the display size of a part at a time when a user generated the part on display section 110 by using hand-held device 100, and distance D at the time when the user generated the part, the part is displayed on the common screen in an easily viewable display size for the user who generated the part. On the other hand, in the second preferred embodiment, by converting the display size of a part in accordance with the distance from the farthest viewer to the common screen based on the display size (screen size) of hand-held device 100 of the user, the converted part can be displayed on the common screen.

Although the embodiments of the present invention have been described by way of the accompanying drawings, it should be noted that specific structures are not restricted to those shown in the embodiments. Various changes and modifications should be construed as being contained in the present invention unless such changes and modifications depart from the scope of the present invention.

For example, although common display apparatus 200 has a single sensor 231 at a position of the top portion of display section 210 in the first preferred embodiment and second preferred embodiment, the embodiments are not limited to this structure, and common display apparatus 200 may have a plurality of sensors.

Figure 12:
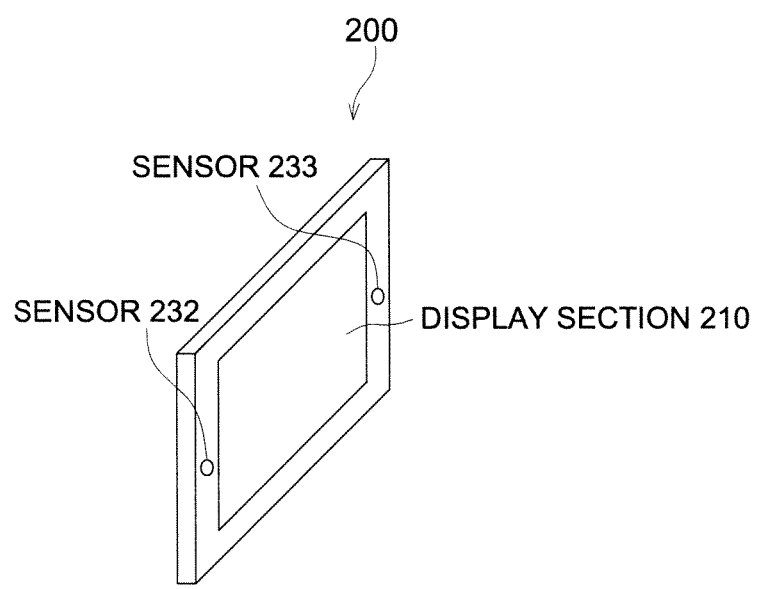
FIG. 12 is an explanatory diagram illustrating a concrete example in which a common display apparatus is provided with two sensors.

FIG. 12 is an explanatory diagram illustrating a concrete example in which common display apparatus 200 is provided with two sensors. Common display apparatus 200, illustrated in FIG. 12, is equipped with sensor 232 and sensor 233 located on either side of display section 210. In this case, common display apparatus 200 can calculate: a) the distance from sensor 232 to a farthest viewer who is farthest away from sensor 232; and b) the distance from sensor 233 to a farthest viewer who is farthest away from sensor 233, and when displaying a part on display section 210, common display apparatus 200 can apply the ratio of enlargement or reduction of the sensor which is closer to the position where the part is displayed on the common screen. Specifically, when applied to the first preferred embodiment, for example, there is a plurality of people who view the common screen of display section 210, and distance from sensor 232 to a first farthest viewer who is the farthest viewer of sensor 232, and distance from sensor 233 to a second farthest viewer who is the farthest viewer of sensor 233, are measured respectively in step S101. Then, in a case in which the distance between sensor 232 and the first farthest viewer differs from the distance between sensor 233 and the second farthest viewer, the ratio for the part to be displayed on the common screen is calculated, in step S102, based on the greater distance of either the first farthest viewer or the second farthest viewer, namely, the ratio is calculated based on the distance of the farthest viewer who is farthest away. In such a way, a part is enlarged or reduced by the ratio based on the distance of the farthest viewer, and thus, the part can be displayed in an easily viewable and optimal display size on the common screen for all viewers wherever the part is displayed on the common screen.

Also, in a similar fashion as the first preferred embodiment, an average distance of all participants may be applied instead of the observation distance of the farthest viewer. There may be a case in which the display size of a part is too large for a person directly in front of the common screen if the observation distance of the farthest viewer is used as a criterion, and also, by calculating an average distance by using a plurality of sensors, an easily viewable ratio, which suppresses variation in observation distances, can be calculated. It should be noted that this can also be applied in a similar fashion to the second preferred embodiment.

Furthermore, for example, because the distance of three sides, connecting three points of both sensors and a predetermined farthest viewer, can be measured by applying triangulation by using the sine theorem, the distance from the position coordinate of the predetermined farthest viewer to the position coordinate of a part to be displayed on the common screen of display section 210 can also be calculated. Specifically, from the distance information of one side connecting sensor 232 and sensor 233, and the distance information of the predetermined farthest viewer acquired from sensor 232 and sensor 233, the distances of above-described three sides are measured. In this case, because the angles of the predetermined farthest viewer to the common screen with respect to each of sensor 232 and sensor 233 have been determined, the distances of three sides, connecting sensor 232 and sensor 233 and the predetermined farthest viewer, can be calculated by using triangulation. Based on the distances of the three sides, because the distance from a display position when a part is displayed on display section 210, to the predetermined farthest viewer can be calculated, the measurement of observation distance in the first preferred embodiment and the second preferred embodiment (step S101 and step S201) can be conducted based on the distance information from the display position to the predetermined farthest viewer.

Also, for example, although the distance to the farthest viewer is acquired by measuring the distances of a plurality of people via sensor 231 provided on common display apparatus 200 in the first preferred embodiment and the second preferred embodiment, the preferred embodiments are not limited to this, and by providing sensor section 230 on a separate body that is different from common display apparatus 200, the distance to the farthest viewer may be acquired by calculating the distance and direction from the common screen to the farthest viewer by measuring the distances and directions from this sensor section 230 to the common screen and from sensor section 230 to the farthest viewer.

Figure 13:
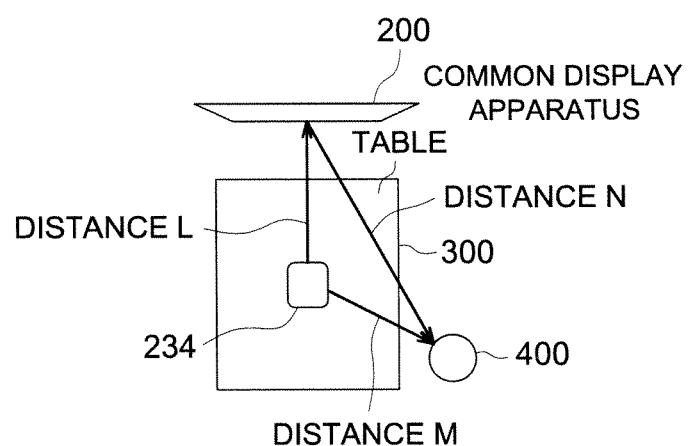
FIG. 13 is an explanatory diagram illustrating a case, in which a sensor section is provided separately from the common display apparatus, according to another preferred embodiment.

FIG. 13 is an explanatory diagram illustrating a case, in which sensor section 230 is provided on a separate body that is different from the common display apparatus, according to another preferred embodiment. This preferred embodiment, illustrated in FIG. 13, is constituted in such a way that sensor 234 is provided on table 300. Sensor 234 measures distance L and the direction from sensor 234 to common display apparatus 200, and distance M and the direction from sensor 234 to member 400 (farthest viewer). In this case, sensor 234 can calculate distance N from common display apparatus 200, having the common screen, to member 400 by measuring distance L, distance M and respective directions by applying the above-described triangulation.

Also, for example, although sensor section 230 provided on common display apparatus 200 calculates the distance of the farthest viewer in the first preferred embodiment and the second preferred embodiment, the embodiments are not limited to this, and the embodiments may be constituted in such a way that common display apparatus 200 acquires distance information of the depth of the room, or the distance to a position where a chair is arranged, instead of the distance information of the farthest viewer.

Furthermore, for example, the embodiments may be constituted in such a way that device distance information from common display apparatus 200 to hand-held device 100 is acquired. In this case, for example, sensor 230 of common display apparatus 200 may measure the distance to hand-held device 100, or sensor 140 of hand-held device 100 may measure the distance to display section 210 of common display apparatus 200. Also, the method for measuring the distance between hand-held device 100 and common display apparatus 200 is not limited to the use of a sensor, and the embodiments may be constituted in such a way that the distance is calculated by using a GPS (Global Positioning System). In this case, the measurement can be realized by incorporating a module, in which a GPS function is installed, into hand-held device 100, and by using application software utilizing the GPS function. With the use of a GPS function, when hand-held device 100 communicates with common display apparatus 200 before measuring the distance in step S101 and step S201 in FIG. 5 and FIG. 10, it can be determined whether that hand-held device 100 participates in the conference or not, and therefore, the distances are measured in step S101 and step S201 only with respect to hand-held devices 100 which have been determined to have participated in the conference. In such a way, it becomes possible to identify only participants in the conference, and, for example, even if there are people who have nothing to do with the conference, the distances to the conference participants can be measured accurately without being influenced by the people who have nothing to do with the conference.

Also, for example, in the first preferred embodiment and the second preferred embodiment, display data transmission section 180 may transmit generated data to common display apparatus 200 to display an arbitrary part, and may further receive instruction to enlarge or reduce the part displayed, with respect to each of the parts displayed on common display apparatus 200, from the user who manipulates hand-held device 100. In this case, the user can enlarge or reduce the part into an easily viewable size by operating operation section 130 of hand-held device 100 while controlling common display apparatus 200 to display the part on the common screen.

Furthermore, for example, in the first preferred embodiment and the second preferred embodiment, display data transmission section 180 may transmit generated data to common display apparatus 200 to display an arbitrary part, and may receive instruction to enlarge or reduce the part, which hand-held device 100 has controlled common display apparatus 200 to display, from the user who manipulates that hand-held device 100, with respect to each of hand-held devices 100. In this case as well, the user can enlarge or reduce the part into an easily viewable size by operating operation section 130 of hand-held device 100 while controlling common display apparatus 200 to display the part on the common screen. For example, when an operation of enlargement or reduction is received, all of the plural parts which hand-held device 100 has controlled to display, including the part having been displayed before the reception of the operation, are enlarged or reduced. It is to be noted that, with respect to a part which is displayed via hand-held device 100 after receipt of the operation of enlargement or reduction, the part may be displayed by applying the ratio of enlargement or reduction which had been used earlier. In other words, when an operation of enlargement or reduction is received, the enlargement or reduction ratio may be applied to: a) only the parts which have been displayed before receipt of the operation; b) only the parts which have been displayed after receipt of the operation; or c) all of the parts displayed via hand-held device 100 regardless of time of receipt of the operation.

Furthermore, for example, in the first preferred embodiment and the second preferred embodiment, although data manipulation transmission apparatus 190 transmits data of a part to be displayed on the common screen of display section 210, the data may be information pertaining to a ratio for enlarging or reducing the part displayed on display section 110 of hand-held device 100, or may be data of the display size after the part, displayed on display section 110 of hand-held device 100, has been enlarged or reduced, or data of the part having been enlarged or reduced.

Also, although the ratio for enlarging or reducing the part, displayed on display section 110 of hand-held device 100, is calculated based on the distance between the common screen installed on common display apparatus 200 and a person, and distance D between hand-held device 100 and the operator in the first preferred embodiment, the preferred embodiment is not limited to this. For example, the ratio of display size of a part to be displayed on the common screen may be calculated only in accordance with the distance between the common screen of common display apparatus 200 and a person, by determining the display size of display section 110 of hand-held device 100 to a predetermined display size. In this case, because the visual influence of the display size of the part, due to the difference in distance D between hand-held device 100 and the operator, is considered to be small, the ratio of display size of the part to be displayed on the common screen may be determined only by the distance between the common screen of common display apparatus 200 and a person, by treating the display size of the part on display section 110 of hand-held device 100 as a fixed value. In this case, the calculation method of the ratio is simplified and sensor 140 of hand-held device 100 is not needed to be installed, and therefore, simplification of a circuit configuration of hand-held device 100 and reduction in weight of entire hand-held device 100 can be attained.

Also, for example, the preferred embodiment is not limited to this, and the embodiment may be constituted in such a way that another file, or the like, is displayed on display section 210 and a part is displayed by being superimposed on the file, or the embodiment may be constituted in such a way that a comment of conference participants is added in series from a blank state.

Furthermore, the whole display content of one screen of display screen of display section 110 of hand-held device 100 is treated as a part in the first preferred embodiment as well as the second preferred embodiment, the preferred embodiments are not limited to this, and the embodiments may be constituted in such a way that each individual object is treated as a part.

What is claimed is:

1. An electronic conferencing system comprising:
an information input device including a display screen on which a display object is generated based on an input to the information input device;
a common display apparatus including a display screen; and
a data manipulation transmission apparatus, including:
an object acquisition section for acquiring the display object, having been generated on the display screen of the information input device, from said information input device which is manipulated by a user;
a distance information acquisition section for acquiring a distance information from the display screen of the common display apparatus to a person who views the display screen of said common display apparatus, the person being at a position farthest away from the display screen of said common display apparatus among people who view the display screen of said common display apparatus when viewed by a plurality of people;
a display ratio determining section for determining a ratio of a display size of the display object on the display screen of said common display apparatus, to a display size of the display object on the display screen of said information input device, in accordance with said distance information; and a display data transmission section for generating a data to display the display object, having been acquired via said object acquisition section, on the display screen of said common display apparatus, at the ratio, having been determined via said display ratio determining section, and transmitting the data to said common display apparatus, wherein said distance information acquisition section is configured to acquire a user distance information from the user, who manipulates said information input device, to the information input device, and wherein said display ratio determining section is configured to determine the ratio of a display size of the display object on the display screen of said common display apparatus, to a display size of the display object on the display screen of said information input device, based on a ratio of a distance at which the user views said information input device to a distance from the display screen of said common display apparatus to the person at the position farthest away from the display screen of said common display apparatus.

2. The data manipulation transmission apparatus described in claim 1, wherein said distance information acquisition section is configured to acquire, from a plurality of different measurement points having been provided on said common display apparatus, respectively, a distance information from the display screen of said common display apparatus to people who view the display screen of said common display apparatus, and said distance information acquisition section is configured to control said display ratio determining section to determine said ratio based on a distance information of a maximum distance among the acquired distance information.

3. The data manipulation transmission apparatus described in claim 2, wherein said distance information acquisition section is configured to: a) acquire distance information from a plurality of different measurement points, having been provided on said common display apparatus, to people who view the display screen of the common display apparatus at each of positions farthest away from said plurality of different measurement points; and b) control said display ratio determining section to determine said ratio at each of said plurality of different measurement points based on the distance information of each of the positions farthest away, having been acquired, and wherein, when displaying the display object on the display screen of said common display apparatus, said display data transmission section is configured to: a) generate a data to display the display object at said ratio of a measurement point closest to a position where the display object is displayed; and b) transmit the data to said common display apparatus.

4. The data manipulation transmission apparatus described in claim 1, wherein said display ratio determining section is configured to: a) distinguish a character data in the display object, having been acquired via said object acquisition section; and b) determine a ratio of a character size on the display screen of said common display apparatus, to a character size on the display screen of said information input device, with respect to the distinguished character data, based on said distance information, and wherein said display data transmission section is configured to: c) generate a data to display only the character data in the display object, having been acquired via said object acquisition section, on the display screen of said common display apparatus based on said ratio having been determined via said display ratio determining section, and d) transmit said data to said common display apparatus.

5. The data manipulation transmission apparatus described in claim 1, wherein said display ratio determining section is configured to: a) distinguish a character data in the display object, having been acquired via said object acquisition section; and b) determine a ratio of a character size on the display screen of said common display apparatus, to a character size on the display screen of said information input device, with respect to the distinguished character data, based on said distance information, and wherein said display data transmission section is configured to: c) generate a data to display an entity of the display object, having been acquired via said object acquisition section, on the display screen of said common display apparatus based on said ratio having been determined via said display ratio determining section; and d) transmit said data to said common display apparatus.

6. The data manipulation transmission apparatus described in claim 1, wherein said display ratio determining section is configured to: a) determine a size of a character, to be displayed on the display of said common display apparatus, as a character size corresponding to a distance indicated by said distance information; and b) control said display data transmission section to generate a data to display said display object on said display screen in such a manner that the size of the character in said display object becomes said character size having been determined.

7. The data manipulation transmission apparatus described in claim 1, wherein said display ratio determining section is configured to determine a display size of the display object on the display screen of said common display apparatus in accordance with said distance information from the display screen of said common display apparatus, as a substitute for said ratio, and wherein said display data transmission section is configured to: a) generate a data to display the display object, having been acquired via said object acquisition section, in the display size having been determined via said display ratio determining section, as a substitute for generating said data based on said ratio; and b) transmit the data to said common display apparatus.

8. The data manipulation transmission apparatus described in claim 1, wherein said display data transmission section is configured to: a) set an appropriate size range when displaying the display object on the display screen of said common display apparatus based on a size of the display screen of said common display apparatus, and in a case in which a display size, with which the display object, having been acquired via said object acquisition section, is displayed in the ratio, having been determined via said display ratio determining section, deviates from said appropriate size range; b) generate said data to display the display object on the display screen of said common display apparatus by making an adjustment such that the display size of said display object fits inside said appropriate size range; and c) transmit the data to said common display apparatus.

9. The data manipulation transmission apparatus described in claim 1, wherein said display data transmission section is configured to: a) transmit said data, having been generated, to said common display apparatus to display the display object; and b) receive an instruction to enlarge or reduce the display size, with respect to each of the display object displayed on said common display apparatus, from the user who manipulates said information input device.

10. The data manipulation transmission apparatus described in claim 1, wherein said display data transmission section is configured to: a) transmit said data, having been generated, to said common display apparatus to display the display object; and b) receive an instruction to enlarge or reduce the display object, which said information input device has controlled said common display apparatus to display, with respect to each of said information input device, from the user who manipulates said information input device.

11. The data manipulation transmission apparatus described in claim 1, wherein a data which said display data transmission section generates, comprises the ratio having been determined via said display ratio determining section, and wherein said display data transmission section is configured to: a) generate a data having the display object, having been acquired via said object acquisition section, enlarged or reduced based on said ratio; and b) transmit the data to said common display apparatus.

12. The data manipulation transmission apparatus described in claim 1, wherein a data which said display data transmission section generates, comprises a data which is made by adding an information, to the display object having been acquired via said object acquisition section, for displaying the display object in the ratio which said display ratio determining section has determined.

13. A nontransitory computer-readable recording medium recorded therein a program to execute procedures of an electronic conferencing system having an information input device, a common display apparatus, and a data manipulation transmission apparatus, the information input device including a display screen on which a display object is generated based on an input to the information input device, the common display apparatus including a display screen, the procedures comprising:
   an object acquiring procedure of acquiring the display object, having been generated on the display screen of the information input device, from said information input device which is manipulated by a user;
   a distance information acquiring procedure of acquiring a distance information from the display screen of the common display apparatus to a person who views the display screen of said common display apparatus, the person being at a position farthest away from the display screen of said common display apparatus among people who view the display screen of said common display apparatus;
   a display ratio determining procedure of determining a ratio of a display size of the display object on the display screen of said common display apparatus, to a display size of the display object on the display screen of said information input device, in accordance with said distance information; and
   a display data transmitting procedure of generating a data to display the display object, having been acquired by said object acquisition section, on the display screen of said common display apparatus, at the ratio, having been determined via said display ratio determining section, and transmitting the data to said common display apparatus,
   wherein said distance information acquiring procedure includes a procedure to acquire a user distance information from the user, who manipulates said information input device, to the information input device, and wherein said display ratio determining procedure includes a procedure to determine the ratio of a display size of the display object on the display screen of said common display apparatus, to a display size of the display object on the display screen of said information input device, based on a ratio of a distance at which the user views said information input device to a distance from the display screen of said common display apparatus to the person at the position farthest away from the display screen of said common display apparatus.

14. An electronic conferencing method, comprising steps of:
   providing an information input device including a display screen on which a display object is generated based on an input to the information input device;
   providing a common display apparatus including a display screen; and
   an object acquiring step of acquiring the display object, having been generated on a display screen of the information input device, from said information input device which is manipulated by a user;
   a distance information acquiring step of acquiring a distance information from the display screen of the common display apparatus to a person who views the display screen of said common display apparatus, the person being at a position farthest away from the display screen of said common display apparatus among people who view the display screen of said common display apparatus;
   a display ratio determining step of determining a ratio of a display size of the display object on the display screen of said common display apparatus, to a display size of the display object on the display screen of said information input device, in accordance with said distance information; and
   a display data transmitting step of generating a data to display the display object, having been acquired via said object acquiring step, on the display screen of said common display apparatus, at the ratio, having been determined via said display ratio determining step, and transmitting the data to said common display apparatus,
   wherein said distance information acquiring step includes acquiring a user distance information from the user, who manipulates said information input device, to the information input device, and wherein said display ratio determining step includes determining the ratio of the display size of the display object on the display screen of said common display apparatus, to a display size of the display object on the display screen of said information input device, based on a ratio of a distance at which the user views said information input device to a distance from the display screen of said common display apparatus to the person at the position farthest away from the display screen of said common display apparatus.

* * * * *